US011960459B1

(12) United States Patent
Jonsson et al.

(10) Patent No.: US 11,960,459 B1
(45) Date of Patent: Apr. 16, 2024

(54) MERGING DUPLICATE CUSTOMER DATA

(71) Applicant: Amazon Technologies, Inc., Seattle, WA (US)

(72) Inventors: Jan Henrik Jonsson, Newport Beach, CA (US); Shadie Hijazi, Seattle, WA (US); Davor Golac, Seattle, WA (US); Kuangyou Yao, Seattle, WA (US); Yang Song, Seattle, WA (US); Shobhit Gupta, Seattle, WA (US); Ian James Boetius MacClancy, Boston, MA (US); Lanxin Zhang, Mercer Island, WA (US); Hongtao Liu, San Diego, CA (US); Austin M Nevins, Federal Way, WA (US); Amy Lee, Walnut Creek, CA (US); Meng Xiao Wang, Seattle, WA (US); Blake Stephens, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 17/490,939

(22) Filed: Sep. 30, 2021

(51) Int. Cl.
| | |
|---|---|
| *G06F 16/00* | (2019.01) |
| *G06F 16/215* | (2019.01) |
| *G06F 16/23* | (2019.01) |
| *G06F 16/25* | (2019.01) |
| *H04M 3/51* | (2006.01) |

(52) U.S. Cl.
CPC ........ *G06F 16/215* (2019.01); *G06F 16/2358* (2019.01); *G06F 16/258* (2019.01); *H04M 3/51* (2013.01)

(58) Field of Classification Search
None
See application file for complete search history.

(56) References Cited

U.S. PATENT DOCUMENTS

| | | | | |
|---|---|---|---|---|
| 2011/0125770 | A1* | 5/2011 | Battestini | G06Q 10/00 707/758 |
| 2014/0317079 | A1* | 10/2014 | Obernikhin | G06F 16/2468 707/706 |
| 2019/0102574 | A1* | 4/2019 | Roberts | G06Q 30/0631 |
| 2019/0361851 | A1* | 11/2019 | Rogynskyy | G06F 16/221 |
| 2021/0117396 | A1* | 4/2021 | Iska | G06F 18/24323 |
| 2022/0121687 | A1* | 4/2022 | Tirupati | G06F 9/4843 |

* cited by examiner

*Primary Examiner* — Bai D Vu
(74) *Attorney, Agent, or Firm* — Davis Wright Tremaine LLP

(57) ABSTRACT

Systems and methods are described for merging customer profiles, such as may be implemented by a computer-implemented contact center service. In some aspects, a subset of profiles may be determined that satisfy merging criteria, where individual profiles include a plurality of data fields. At least one value in a first data field that conflicts between at least two profiles may be identified. Next a merged value may be selected for the first data field based on data deduplication criteria, where the data deduplication criteria includes at least one indicator of accuracy of values of the plurality of data fields. As a result of a determination that at least the subset of profiles of the group of profiles meet the merging criteria, at least the subset of profiles may be combined into a combined profile using the merged value.

22 Claims, 9 Drawing Sheets

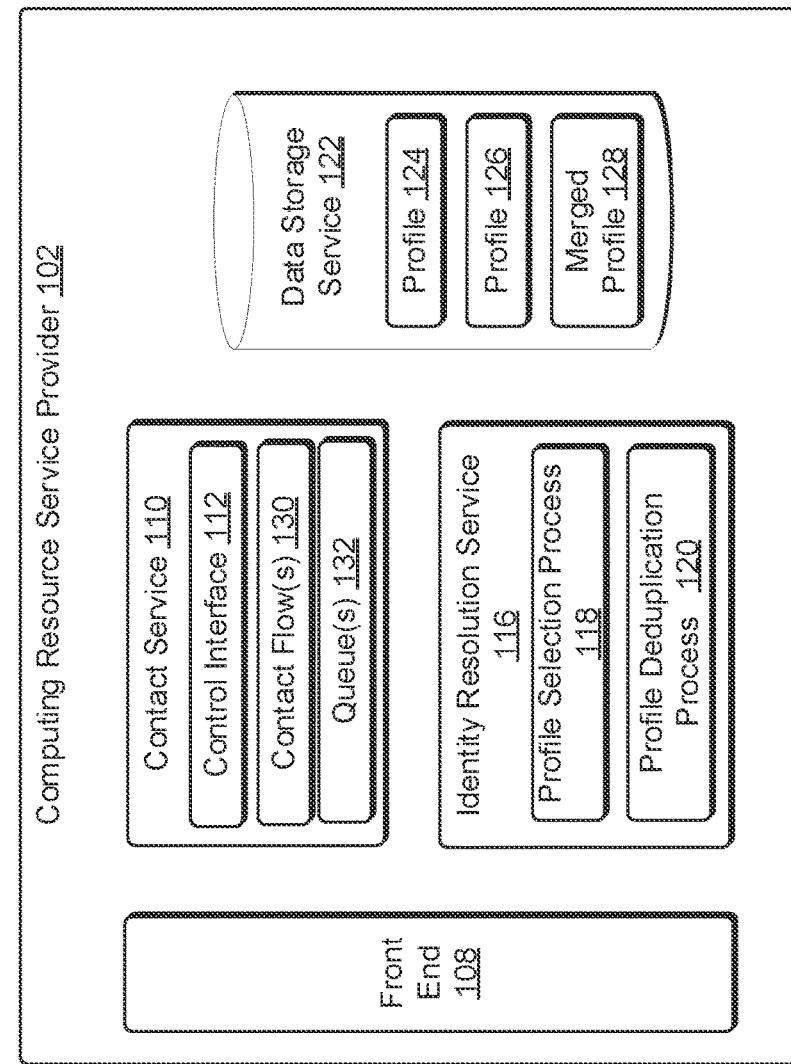
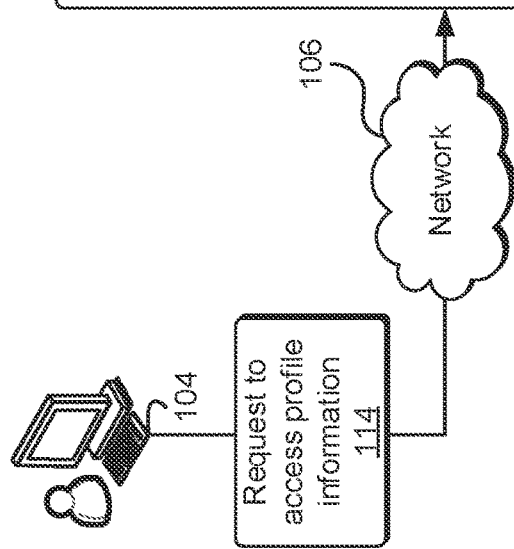
FIG. 1

Profile Merging Criteria 502

| Criteria 504 | Weight 506 |
|---|---|
| Number of fields that match exactly 508 | .2 |
| Number of fields that partially match 510 | .1 |
| Certain field(s) that match exactly 512 | .3 |
| Certain field(s) that do not match 514 | .2 |
| Source of profile 516 | .1 |
| Custom defined criteria 518 | .1 |

Profile Deduplication Criteria 518

| Factors 520 | Priority 522 |
|---|---|
| Recency of data update 524 | 1 |
| Source of data 526 | 2 |
| Data completeness 528 | 3 |
| Data accuracy based on other data fields 530 | 4 |
| Other factors 532 | 5 |

FIG. 5

MERGING DUPLICATE CUSTOMER DATA

BACKGROUND

As many businesses expand, call centers, including partially or fully automated call centers, are becoming more widespread to help handle an increase in communications with customers to resolve issues. Many tools, including cloud-based tools, have been developed to help manage this increase in communication with customers. In many cases, these tools automate a large part of directing a customer to the correct interface to address problems with invoices, returns, troubleshooting, etc., such as through automated multi-level menus or contact flows. In many cases, these call centers aggregate data from a number of different sources and provide a dashboard to call center agents to help them more efficiently resolve issues. In many cases, the data presented to the call center agent contain duplicate data relating to different customer profiles, such as multiple profiles created by different applications or services (e.g., Salesforce, SalesNow, etc.). Parsing through these various profiles and determining which contain accurate or up-to-date information is time consuming and can detract from the customer experience.

BRIEF DESCRIPTION OF THE DRAWINGS

Various techniques will be described with reference to the drawings, in which:

FIG. 1 illustrates an example environment in which the described techniques can be practiced, according to at least one embodiment;

FIG. 5 illustrates examples of profile merging criteria and profile deduplication criteria, according to at least one embodiment;

DETAILED DESCRIPTION

Figure 2:
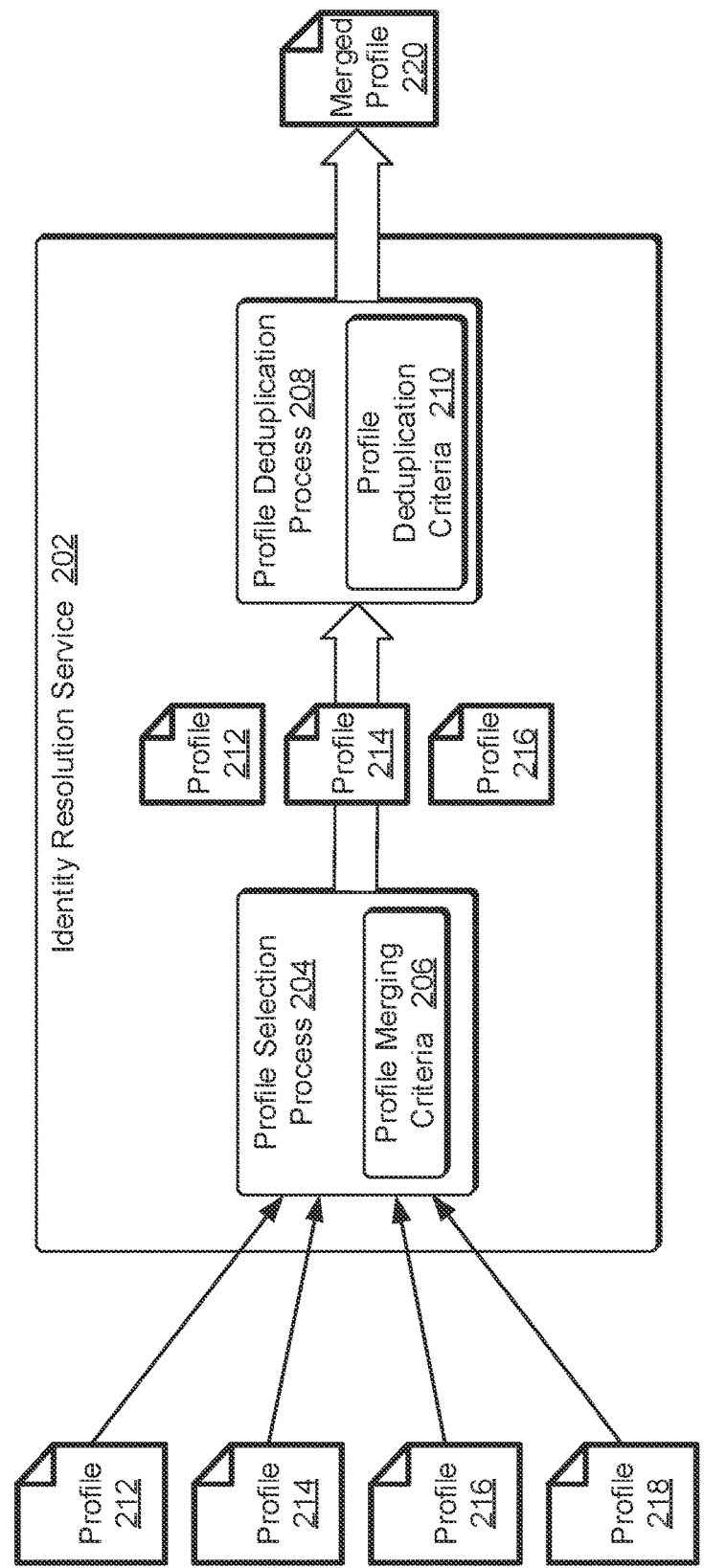
FIG. 2 illustrates an example of an identity resolution service, according to at least one embodiment.

Systems and methods are described herein for identifying and merging duplicate customer profiles, such as may be implemented by a computer-implemented contact center service. In some aspects, multiple profiles may exist for the same customer, such as from a number of $3^{rd}$ party systems. These profiles may be accessible through a centralized dashboard provided by a computer-implemented contact center service. The dashboard may provide agents of the computer-implemented contact center service information relating to customers, contact information, financial information, past order information and the like. In order to increase efficiency of agents accessing customer information, and to help ensure better accuracy of that information, techniques may be implemented to identify profiles that are similar, such that may correspond to the same underlying customer or account, and merge those profiles, to present an accurate and complete view of a customer's profile. The describe techniques may utilize a merging condition or criteria to first determine what profiles are potentially linked to the same customer or account. Next, a deduplication process may be implemented to resolve any conflicts between data contained in the multiple profiles selected for merging.

In some cases, merging criteria may be used to first identify potentially corresponding profiles. The merging criteria may take into account various factors and may weight those factors, to ultimately determine a confidence score that the at least two profiles do in fact, correspond to the same underlying customer or account. These factors may include whether specific data fields match exactly (e.g., data fields that include unique information, such as email address or phone number), a number of data fields that exactly or partially match, certain fields that do not match, a source of where the data is coming from (e.g., the application or service that generated the profile), and/or other customizable factors. In some cases, these factors may be input into a machine learning model that can adapt based on historical information to determine which profiles satisfy criteria for merging.

Once at least two profiles have been selected for merging, the data fields in the profiles may be compared to determine if there are any conflicts. If a conflict is identified, a deduplication process may be performed, where values of the conflicted data fields are selected from one profile of the profiles selected for merging. The deduplication process may prioritize values for selection for the merged profile based on a number of factors, such as recency of the last update for that data, source of the data, completeness of other data fields of the profile, and/or attributes of certain data fields in the profiles. In some cases, the deduplication process may be implemented by one or more machine learning models that are trained via historical data. Once values are selected for the conflicted data fields, a merged profile may be created from the profiles that were selected (e.g., satisfied the merging criteria). In some aspects, the merged profile may then be used, instead of the individual profiles selected for merging, throughout the computer-implemented contact center service. In yet some instances, the merged profiles may be made accessible through the merged profile, to provide a readily accessible complete history of the customer profile data.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) more efficient access to and presentation of customer profile data though one or more user interfaces or dashboards; (2) reduction in network bandwidth usage by providing more efficient access to customer data with less communication to $3^{rd}$ party systems; (3) consolidation of duplicate profiles and scattered profile information into a single profile, thereby reducing time, effort, and resources needed to manage profiles, improving the efficiency of locating profile information, and allowing profiles to be stored more efficiently; (4) improved accuracy in determining whether different profiles are related to the same user using; and (5) other advantages as will be made apparent in the rest of this disclosure.

FIG. 1 illustrates an example environment 100 in which an identity resolution service 116 and a contact service 110 may be provided by a computing resource service provider 102. The identity resolution service 116 may interact with various other computer-implemented services, such as one or more of a front end 108, a contact service 110, and/or a data storage service 122 to provide for customer profile selection and merging functionality, as will be described in greater detail below. Various client computing devices 104 may interact with the computing resource service provider 102 through one or more networks 106 to access this functionality.

Client 104 may refer to a client computer system or computing device connected to a server (e.g., computing resource service provider) over a network 106. In some cases, client 104 refers to a user or operator of a client computer system and may be an employee of an organization that utilizes a computing resource service provider 102 to interact with various forms of data, such as through one or more of an identity resolution service 116, front end 108, contact service 110, and/or data storage service 122. In some cases, computing device 104 may be associated with the computing resource service provider 102, such as may be provided by or through a contact service or other computerized service 110. In these cases, the computing device 104 may be operated by a human operator or user, such as may be referred to generally as an agent. In other aspects, the agent may be fully automated, including textual and audio communications (e.g., a bot). In some cases, the agent 104 may access various services and data provided by the computing resource service provider 102 to facilitate resolving issues with external customers (not illustrated) of the contact service 110. For example, an agent 104 may communicate with a customer through the contact service 110 and may access a control interface 112 of the contact service 110 to obtain information to help a customer resolve one or more issues with an underlying application or service, such as other $3^{rd}$ party system or application, including various customer relationship management (CRM) systems. In some cases, agent 104 may send a request 114 to the computing resource service provider 102 to access profile information relating to a customer, as will be described in greater detail below.

In some cases, the front end 108 may receive the request 114 and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and data and to process them according to one or more policies associated with the service. In some examples, client 104 uses client software that is configured to establish a client-server relationship with a service of a computing resource service provider 102. A client 104 may connect to a service via front end 108, which receives requests from clients and routes them to backend services. Front end 108 may interface with one or more of an identity resolution service 116, a contact service 110, and/or a data storage service 122, and/or other services offered by a computing resource service provider 102 to its customers. In at least one embodiment, client 104 interacts with a GUI to interact with various data provided by or through the computing resource service provider 102, and client-side software translates the GUI setup to a web service API request which is transmitted from the client computer system 104 to front end 108 via a network 106. In an embodiment, the network 106 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider 102 described herein may be implemented using techniques described below in reference to FIG. 9. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide data storage through a data storage service 122 to store and manage large volumes of data, including text, image, and other data. The data storage service 122 may store various data, such as may be organized into various accounts or profiles 124, 125, and 128. Profiles 124, 126, 12 may include one or more versions of various customer data, such as may pertain to the identity of a user or account, order information, financial information, various other information organized in various ways associated with a user of the computing resource service provider 102. More detailed examples of a customer profile, and the data that it may contain, will be described below in reference to FIG. 4. Profiles 124, 126 stored by data storage service 122 may originate from within the computing resource service provider 102 or from any of a number of $3^{rd}$ party systems or applications such as sales systems, inventory systems, and the like.

Data storage service 122 may be an on-demand data storage service, such as an object-based data storage service that services API requests to store and retrieve data objects synchronously, and may be configured to store various forms of data and media, and other data structures generated and updated by the contact service 110 and the identity resolution service 116. The data storage service 122 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 122, may be organized into data objects, in one or more logical data containers. The data storage service 122 may include one or more data objects, which may have arbitrary sizes and may, in some instances, have constraints on size. Thus, the data storage service 122 may store numerous data objects of varying sizes. The data storage service 122 may operate as a key value store that associates data objects with identifiers of the data objects which may be used by the identity resolution service 116 and/or the contact service 110 to retrieve or perform other operations in connection with the data objects stored by the data storage service 122. Access to the object-based data storage service 122 may be through application programming interface (API) calls to the service or via an interface, such as a graphical user interface (GUI). Access to the data storage service 122 may be through application programming interface (API) calls to the service, for example from client device 104 directly or through the computing resource service provider 102 and/or front end 108.

It should be appreciated that the data storage service 122 may additionally or alternatively provide non-object based data storage, such as block data storage, table-oriented data storage, relational databases, file-based storage, and the like. The data storage service 122 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

The computing resource service provider 102 may also provide a contact service 110. The contact service 110 may be a collection of computing resources, including physical resources, virtual resources, or combinations thereof, configured to obtain, direct, and otherwise manage various communications streams from or between various computing devices, such as audio stream between an agent computing device 104 and various customers of the contact service 110. In some examples, the contact service 110 may provide automated or partially automated communications to computing devices, such as text or audio communications, to one or more computing devices 104. In some cases, contact service 110 may facilitate establishing and managing communication channels between various computing devices 104. In some cases, the contact service 110 may provide omnichannel communications. For example, text messaging or chat, voice contact, and/or video contact may be dynamically offered, based on such factors as customer preference and estimated wait times. The contact service 110, in some aspects, can integrate with one or more other services, to provide managed communication channels to users of the one or more services.

The contact service 110 may provide for a wide range of communication services to a variety of computing devices. In some examples, the contact service 110 may operate as a call center, such as for one or more web-based businesses, retailers, etc. In other cases, the contact service 110 may provide communication services to any number of different organizations, such as health related organizations, retail, construction, legal services, etc. It should be appreciated that the techniques described herein have a broad range of applications, and that the above-mentioned use cases are only given by way of example.

In some aspects, the contact service 110 may include one or more control interfaces 112. The control interface may provide a GUI to a computing device or agent associated with the contact service 110, to aid in establishing and managing communication channels with client computing devices. In some cases, the control interface 112 may provide a dashboard to facilitate accessing customer data, such as one or more profiles 124, 126, 128 linked to a specific customer or account. The dashboard or control interface 112 may be provided to an agent device 104 upon receiving a request 114 from the agent 104 to access profile information of a customer, such as may be in communication with the agent device 104 through the contact service 110. As will be described in greater detail below, an identity resolution service 116 may be implemented to access and provide a merged profile 128, such that may contain all available information for a given customer or account across a number of different profile records 124, 126. The dashboard may present the merged profile data 128 to an agent device 104 through the control interface or dashboard 112.

In some cases, the control or user interface 112 may provide any overview of metrics related to identity resolution such as number of profiles reviewed, number of duplicate profiles found, and number of profiles successfully de-duplicated. In some aspects, telemetry may be added that can measure merging accuracy such as precision value and recall value on a weekly basis to continuously improve the quality or profile merging and deduplication of values for the merged profiles.

In some cases, the control interface/dashboard 112 may also provide an interface to facilitate managing various communication channels, various contact flows 130, and/or various queues 132. A contact flow 130 may encompass one or more menu options and routing directions (e.g., automated routing instructions) to respond to a customer inquiry, such as may be received from a computing device 104, in the form of a text or audio stream. A contact flow 130 may be contained in a data structure, which is processed when a communication channel is established, and may include different routing instructions, pointers to different audio recordings, text responses, and the like. In some cases, a contact flow 130 may include one or more automated responses, recorded menu offerings, etc., as will be appreciated by those having skill in the art. The contact service 110 may provide any number of different contact flows 130 to handle various customer inquiries.

The contact service 110 may also provide a number of different queues 132, to which issues and/or action items may be assigned. A queue 132 may be a storage location where an item or data structure is placed, typically temporarily, to be processed at a later time. The various queues 132 may be linked or associated with one or more contact flows 130, such that an action item may be placed in an appropriate queue 132 based on the action that needs to be taken to resolve or close the action. In some cases, the action to be taken may also correspond to a contact flow 130.

The computing resource service provider 102 may also provide an identity resolution service 116. The identity resolution service 116 may be a collection of computing resources, including physical resources, virtual resources, or combinations thereof, configured to identify a number of profiles that potentially correspond to the same customer or account, and merge those profiles into a single or combined profile. In some cases, the identity resolution service 116 may interact with the front end 108, contact service 110, and/or data storage service 122 to provide profile merging functionality, as described in greater detail below.

In some aspects, the identity resolution service 116 may access a number of profiles 124, 126 stored in the data storage service 122. The identity resolution service 116 may perform or provide a profile selection process 118. Profile selection process 118 may identify or determine a number of profiles that potentially refer to the same customer or account. Profile selection process 118 may include determining that at least a subset of profiles satisfy merging criteria, such that the subset of profiles potentially identifies or refers to the same underlying customer or account. In some cases, the criteria may be fixed or static, or may be implemented by one or more machine learning models, as will be described in greater detail below.

In some cases, the merging criteria may include at least one exact match between a value of a first data field of the plurality of data fields between the subset of profiles, such as email address, phone number, or other unique identifier or piece of data that would normally pertain to only one customer or account. In some cases, the merging criteria may additionally or alternatively include a set of data fields matching between the profiles, such as phone number and address. Various other criteria may be used in place of or in addition to the above. In some cases, a confidence score may be determined, which indicated a degree that two or more profiles match or refer top the same customer or account. The confidence score may then be compared to a threshold to determine if a match has been identified. In some cases, the confidence score may be set at a default value (e.g., 70, 80, or 90 percent), and/or may be user configurable.

Once two or more profiles, such as profiles 124, 126, have been selected for merging, the identity resolution service 116 may implement or perform a profile deduplication process 120. Profile deduplication process 120 may include determining if any data fields between the selected subset of profiles conflict, and if so, resolving those conflicts to generate a merged profile, such as merged profile 128, which can then be stored in data storage service 122 for access by the contact service 110. In some examples, the profile deduplication process 120 may implement criteria for selecting a value for a data field where multiple values exist for that data field across the subset of profiles. In some cases, the criteria may be fixed or static, or may be implemented by one or more machine learning models, as will be described in greater detail below. In some cases, profile deduplication process 120 may take into account one or more of the following characteristics of a given data field value/profile to which the data field value belongs: trustworthiness of accuracy of a source associated with the profile, completeness of data across a number of data fields of the plurality of data fields of each of the profile, or recency of an update to the individual data field of the profile. Using these factors or criteria, a value that is most indicative of the correct value may be selected, for each data field where a conflict has been identified. The subset of profiles may then be combined to result in a merged or combined profile 128, which may contain data from the subset of profiles.

In some cases, the merged profile 128 may contain a link or associate in some way the subset of profiles, such as profiles 124, 126, that were combined to form the merged profile 128. In this way, profiles 124, 126 may be accessible from the merged profile 128, for future reference. In some aspects, once a merged profile 128 has been determined, the merged profile may be accessed and used by the contact service 110, such as in response to any reference to one of the profiles that were combined to form the merged profile 128. In some implementations, the profiles that were merged may be linked to the merged profile, such that when an induvial profile is updated or modified, such as by or through the source of that profile, the change may then be passed through to the merged profile.

In some aspects, either as part of the contact service 110, the identity resolution service 116, or as a stand-alone service, the computing resource service provider may provide a data ingestion process or service that ingests data from a number of different 3rd party resources, applications, services, etc. In some cases, this ingestion service may obtain profile information for a number of different customers from a number of different sources. The ingestion service may obtain the profile information and normalize or modify the data contained in the profiles to fit a standardized format. In some cases, this may include changing the values contained in different data fields of the profiles to ensure that they can be compared to determine if they share the same value. For example, in a first profile, a phone number may include parathesis around the zip code, may not include a country code, and may include spaces, whereas in another profile, there may be a country code, no parenthesis and a dash before the last 4 digits of the phone number. In order to aid in selecting profiles that correspond to the same account, it may be beneficial to standardize these values. This may include selecting a universal format (country code, parenthesizes, and spaces) and then converting the values in the profiles prior to or during the ingestion process, such that profiles 124, 126 saved by the data storage service, may have data fields that have been standardized or normalized to a consistent format and number of characters. Any other data fields may similarly be normalized, including name, address, email address, social security number, etc.

In some cases, the different data fields in profiles may be identified and labeled during the ingestion process. Different data fields, such as email address, phone number, etc., may be identified, if not otherwise already labeled, as a specific data field based on characteristics of the data, such as including at least a certain number of numbers, including an @ symbol, and the like. In some cases, during the ingestion process, an indicator of the source of the data (e.g., the application or service from where the profile was obtained), and/or a time stamp may be associated with the profile during the ingestion process. In yet some examples, an indicator or time stamp that indicates when the data was last updated may be obtained from the source of the profile information and appended to the individual data field or the profile during the ingestion process.

In various aspects, the described techniques may provide benefits in one or more of the following use cases: finding duplicate customer profiles by comparing name, email address, phone number and address between CRM multiple applications; merging duplicate customer profiles into a unified profile to improve agent productivity and a single view of the customer; changing the attributes for finding duplicates profiles depending on the business/client needs such as name, email, address, phone number; review sample matches for determining accuracy of prediction and providing to train one or more machine learning models used to identify profiles for merging; and/or updating the unified profile with changes in upstream CRM systems. In some cases, the described techniques incorporate one or more of the following attributes to provide one or more of the following advantages over existing systems: 1) a machine learning based model to predict duplicate profiles, 2) a user interface to define rules for automatic merging of similar profiles, and 3) a user interface to review duplicate profiles and provide feedback to train the machine learning model.

FIG. 2 illustrates an example of an identity resolution service 202, such as may be implemented by a computing resource service provider 102. Identity resolution service 202 may include one or more aspects of identity resolution service 116 described above in reference to FIG. 1. As illustrated identity resolution service 202 may include or execute a profile selection process 204 and a profile deduplication process 208. The profile selection process 204 may utilize profile merging criteria 206 to identify profiles that potentially refer to the same customer or underlying account. An example of profile merging criteria 206 will be described below in reference to FIG. 5. The profile deduplication process 208 may utilize profile deduplication criteria 210 to resolve any conflicts between data fields of the profiles selected for merging. An example of profile deduplication criteria 210 will be described below in reference to FIG. 5.

As illustrated, profile selection process or component 204 may identify a number of profiles, such as profiles 212, 214, 216, 218, that identify, reference, or potentially correspond to the same customer or account, such as by using profile merging criteria 206. This may include, for example, determining that one field, such as a field that would uniquely identify a customer, such as email address, social security number, etc., matches between profiles 212-218. The profile merging criteria 206 may be customizable for different clients and/or for different applications, such that different data fields may be used to identify potential matches. In some cases, for example, email address may be enough to uniquely identify a customer or account. In other cases, social security number may be available and sufficient for this purpose. In yet other cases, detecting a match across multiple data fields may be more desirable, such as name, email address, and phone number, such as where there are a large number of accounts. In yet some cases, it may be particularly useful to detect a subset number of matches across a larger set of data fields, such as when some of the data may be missing or not entered for at least some of the data sources. It should be appreciated that the above are only given by way of example, and that a variety of other schemes for determining potential profile matches are contemplated herein. In some cases, profiles 212-218 may be initially selected for a deeper comparison based on one or a number of data fields between the profiles matching. Once that group is selected, a greater number of data fields (e.g., some or all of the data fields) of the profiles may then be compared to determine if the selected profiles match to enough of an extent to be merged into one single profile. In some cases, multiple factors may be compared, and a confidence score determined for a given pair of profiles that indicates to what extent the profiles refer to the same customer or account. The confidence score may then be compared to one or more configurable threshold values to ultimately determine if the profiles should be merged.

In the example illustrated, profiles 212, 214, 216 meet the criteria for merging, as output by the profile selection process 204, whereas profile 218 does not. In this example, profile 218, may for instance, include some similar identifying information as profiles 212, 214, 216, but may not meet the criteria for merging. The profile selection process 204 may output an indication of which profiles meet the merging criteria 206 to the profile deduplication process 208. The output may take the form of a message and may include indications of profiles 212, 214, 216.

The profile deduplication process 208 may then compare the data fields in profiles 212, 214, 216 to determine if the data fields contain any conflicting values, such as different phone number, different address, email address, etc. The profile deduplication process 208 may then utilize profile deduplication criteria 210 to prioritize and select values for each of the conflicted data fields. This may include prioritizing recently updated values, completeness of other data fields in a given profile, source of the profile, and various other factors. The profile deduplication process 2108 may then output a merged profile 220. Merged profile 220 may contain values for each data filed found in a least one or profiles 212, 214, 216. Merged profile 220, in some cases, may include data or an indication thereof from profiles 212, 214, 216 to enable a user, such as an agent operating agent device 104, to determine where certain values for certain data fields originated.

Figure 3:
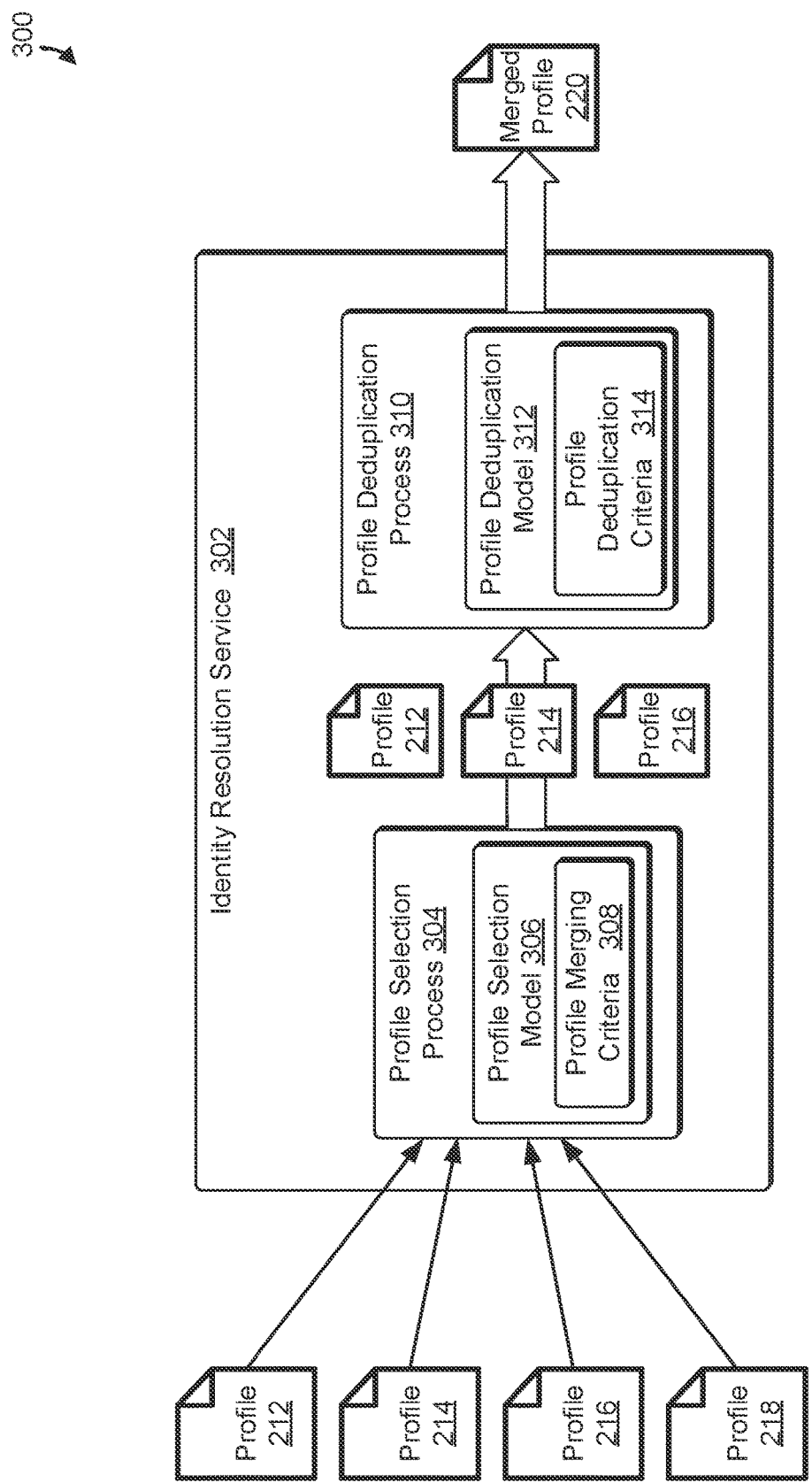
FIG. 3 illustrates another example of an identity resolution service, according to at least one embodiment.

FIG. 3 illustrates another example of an identity resolution service 302, such as may be implemented by a computing resource service provider 102. Identity resolution service 302 may include one or more aspects of identity resolution service 116, 202 described above in reference to FIGS. 1 and 2. Identity resolution service 302 may be similar to identity resolution service 202 described above in reference to FIG. 2, except that the profile selection process 304 may include accessing or executing a profile selection model 306, and profile deduplication process 3010 may include accessing or executing a profile deduplication model 312.

The profile selection model 306 may include any type of machine learning model, that is trained on labeled data, such as including historical data that may be uploaded to the identity resolution service 302, and/or data that may be obtained through operation of the identity resolution service 302. The profile selection model 306 may utilize different factors for selecting profiles that match, for purposes of merging, and in some cases may utilize profile merging criteria 308. In some cases, profile merging criteria 308 may be similar to profile merging criteria 206 described above in reference to FIG. 2, and/or utilize profile merging criteria 502 described below in reference to FIG. 5. In some cases, the identity resolution service 302 may request or require confirmation that certain profiles can be merged, such as from a client or client device. Once at least two profiles are selected for merging, the identity resolution service 302 may request confirmation or approval or the merger prior to merging the profiles into a merged profile 220. In other cases, the approval may be requested after the profiles have been merged, and in some cases, the merging may be modified based on the approvals obtained. In any of these cases, the confirmation or approval, when linked to what profiles were merged, may serve as labeled training data for the profile selection model 306. In this way, the profile selection model 306 may adapt over time to become more accurate in determining profiles for merging.

Similarly, the profile deduplication model 314 may include any type of machine learning model, that is trained on labeled data, such as including historical data that may be uploaded to the identity resolution service 302, and/or data that may be obtained through operation of the identity resolution service 302. The profile deduplication model 314 may utilize different factors for selecting which values to use in the scenario of a conflict between one or more data fields across at least two profiles selected for merging, and in some cases may utilize profile deduplication criteria 314. In some cases, profile deduplication criteria 314 may be similar to profile deduplication criteria 210 described above in reference to FIG. 2, and/or utilize profile deduplication criteria 518 described below in reference to FIG. 5. In some cases, the identity resolution service 302 may request or require confirmation (either prior to merging, during or after) that a given value may be used for a data field where that value conflicted between two profiles to be merged. In some cases, the identity resolution service 302 may track when values are changed in the merged profile in the future and compare that information to values selected (and not selected) during the profiling merging. Some or all of this data may be tracked and/or obtained and used to train the profile deduplication model 314. In this way, the profile deduplication model 314 may adapt over time to become more accurate in determining values to use in merging profiles.

In some cases, profile selection model 306 and profile deduplication model 314 may be combined into the same machine learning model. In this implementation, the training data may include any confirmed merged profiles and/or values used for that merged profile. In some cases, only the profile selection model 306 may be utilized where the deduplication process may use criteria that is not incorporated into a machine learning model, and vice versa. In yet some examples, a combination of criteria and machine learning may be utilized to enhance accuracy of merging profiles and the values selected for those merged profiles. In some cases, the profile selection process 304 and/or the deduplication process 310 may incorporate or be based on a non-deterministic and evolving model. In some aspects, processes 304, 310 and/or models 306, 314 may be utilized to aid in normalizing profile information when the profile information is ingested, as described above in reference to FIG. 1. For example, process 304/model 306 may be used to identify phone numbers with different kind of formatting, mis-spelled names, etc., to then identify those profiles as candidates for merging.

In some aspects, one or more of models 306, 314 may be trained across a number of different clients and data sources. At some point in time, such as when enough training data specific to a client has been obtained, a client specific model may be generated and further trained on only training data that is specific to a given client. In some aspects, this client specific model may be further refined or customized by the client, such as to weight different data fields for determining matching, and the like. In some cases, the identity resolution service 302 may provide an extremely simple method of ingesting data from different systems that have no common identifier to tie the data together and merging this data together into a single coherent profile with no knowledge from the customers perspective of machine learning.

In some cases, results of the profile selection process 304 and/or the results of the profile deduplication process 310 may be stored, for example, by a data storage service 122, and used for various purposes. In some cases, the results may include profiles that were ultimately merged, and the factors that led to that outcome. This may include what data fields matched or supported the merging, as well as other factors that supported the result of the merged profile and factors that did not support that result, or factors that weighed towards not merging. In some cases, the results may include profiles that were not merged, and various data that supported that result, such as data fields that did not match other data fields, various attributes of the profile that was not merged and/or the profiles that were merged, etc.

In some cases, these results may be provided to a user, such as user 104 through control interface 112. In some cases, these results may be provided to enable the user 104 to override the merger determination, such as to indicate a merged profile was incorrect, or conversely, to indicate that a profile that was not merged should be merged. In some aspects, the user may modify the merged profiles via the control interface 112, to override the determinations made by the identity resolution service. In some cases, the results, and confirmation or overriding of the results, may be collected and used as training data for one or more of the profile selection model 306 and/or the profile deduplication model 312. In other cases, these results may be used to modify or refine the profile merging criteria 308 and/or the profile deduplication criteria 314. In yet some examples, the results, and user interaction with those results may be used to modify the profile merging criteria 206 and/or the profile deduplication criteria 210 as described above in reference to FIG. 2, abstracted from machine learning models 306, 312.

Figure 4:
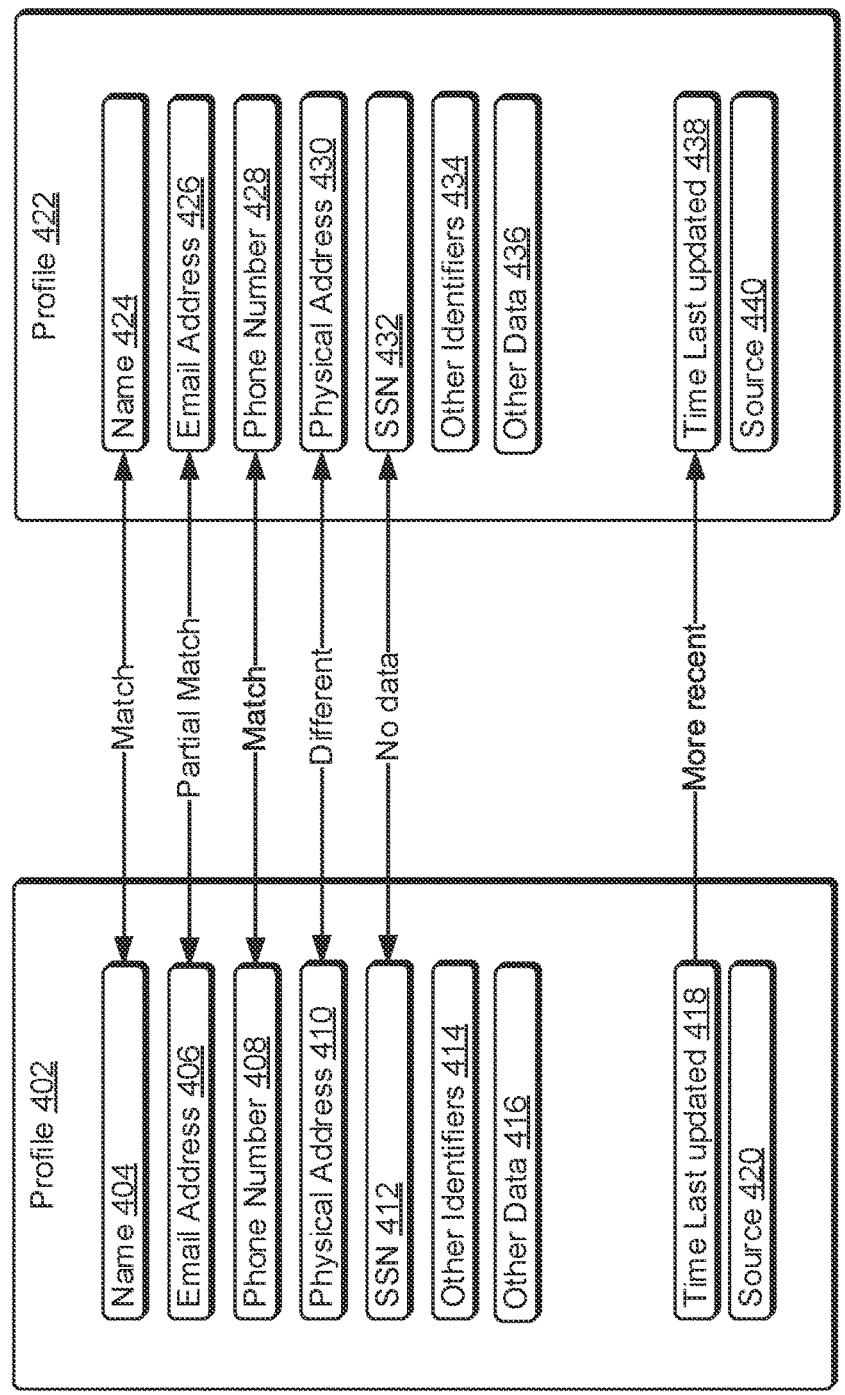
FIG. 4 illustrates an example of profile comparison and matching, according to at least one embodiment.

FIG. 4 illustrates an example 400 of profile comparison and matching between two profiles 402 and 422. Example profiles 402, 422 may be representative of profile used in any of the above-described systems and services. It should be appreciated that profiles 402, 422, and the data fields contained therein are only given by way of example, and that profiles including other data fields are contemplated herein.

As illustrated, various data fields from at least two profiles 402, 422 may be compared, and some type of determination made as to the extent to which the values in those data fields match. For example, name values 404, 424 and phone numbers 408, 428 may be determined to match or include the same values. Email addresses 406, 426 may be determined to partially match, such that one or more characters between values 406, 426 are different. Physical address values 410, 430 may be different, such that less than a threshold number of characters match between the two values 410, 430. In addition to those values, other values may be compared, when available such as social security number 412, 432 or other identifier (tax identifier, driver's license number, passport number, etc.). In yet other cases, other data 416, 436 may be compared, which may include just a zip code of an address, date of birth, billing address, financial information (e.g., credit card or partial credit card information), and so on. In yet some examples other data 416, 436 may include data relating to the customer, account, history thereof, or related information, such a purchase or order history, prior identifying information including prior address or parts of an address (e.g., zip code).

These various data fields of the profiles 402, 422 may be compared and some type of indicator of whether the profiles do in fact reference the same individual, customer, or account may be generated. In some cases, the indicator may include a binary indicator, e.g., match or no match, or may include a confidence score or other range of values (e.g., out of 0-1, 1-5, 1-10, 1-100, etc.) that indicate an extent to which the profiles do match. A more detailed example of criteria used to generate this output, e.g., an indicator of whether profiles match, will be described in greater detail below in reference to FIG. 5.

In some cases, in addition to the data or data fields of profiles 402, 422, various metadata of the profiles 402, 422 may also be analyzed to aid in determining whether the profiles reference the same underlying account and are therefore suitable candidates for merging. In some cases, this metadata may include the time the profile was last updated 418, 438. In some cases, a more recently updated profile will be given more weight in resolving any conflicts between different data of the profiles 402, 422. In some case, the update time may refer to an entire profile, or may be specific to one or more individual data fields of the profile 402, 422. For example, a physical address may have been updated more recently than other values of profile 402. In this case, metadata 418 may include a time last updated for the entire profile and another time for when the address was updated. This type of data may be particularly useful in resolving any conflicts between data field of profiles that have bene selected for merging. The metadata may also include a source of the data 420, 440, such as an indicator of the third-party application from where the profile was obtained. In some cases, certain sources may be universally deemed more reliable, and/or may be specified by a client to be more trustworthy or indicative of accurate information than other sources. These and other forms of various metadata may be used, when available, to aid in outputting a more accurate merged profile.

FIG. 5 illustrates examples of profile merging criteria 502 and profile deduplication criteria 518, such as may be used by an identity resolution service, such as identity resolution service 116, 202, 302 and/or components thereof, such as a profile selection process 118, 204, 304, a profile deduplication process 120, 208, 310, profile selection model 306, or profile deduplication model 312, as described above in reference to FIGS. 1-3.

In some cases, profile merging criteria 502 may include one or more aspects of profile merging criteria 206, 308, described above, and/or may be used in place of these criteria in the systems and services described above. As illustrated profile merging criteria 502 may include a number of factors or criteria 504 and weights 506 associated with those criteria. In the example illustrated, the number of fields between two profiles that match exactly 508 may be given a weight of 0.2 (out of 1). Similarly, the number of fields between two profiles that match partially 510 may be given a weight of 0.1. Certain filed that match exactly 512 may be given a higher weight of 0.3, such as when these fields would uniquely identify an individual or account, such as social security number, email address etc. Certain fields that do not match 514 may also be factored in and given a certain weight, such as 0.2. For example, a phone number may not match between wo profiles. This may not be conclusive that the two profiles do not in fact refer to the same underlying account or customer. However, in other cases, when social security number does not match, or email address, this may weigh mor heavily on two profiles not matching. In other cases, the source of the profile itself 516 may given a certain weight, and other criteria 518 may also be considered and given a particular weight.

It should be appreciated that the above list of factors or criteria and any given weights are only given by way of example, and that other criteria, other weights, and various combinations of variations in either dimension are contemplated herein. In some cases, the specific criteria/factors used and/or the weights given to those factors may evolve over time, such as in the case where the profile merging criteria 502 is utilized by a machine learning model. In some cases, the criteria and/or weights may evolve over time across a number of different clients (e.g., a universal model) and/or across a specific client (e.g., client specific model or implementation). In some cases, other schemes may be utilized for analyzing a number of different criteria for selecting profiles to merge, such as a prioritization scheme, neural networks, and other various data analytic techniques, as may be known by those of skill in the art.

In some cases, profile deduplication criteria 518 may include one or more aspects of profile deduplication criteria 210, 314 described above, and/or may be used in place of these criteria in the systems and services described above. As illustrated, different factors 520 may be given different priorities 522 in evaluating what value to select to enter into a data field for a merged profile when the value for that data field conflicts between two profiles selected for merging. As illustrated, a recency or time associated with an update to a value 524 for a given data filed may be given the first priority, such that more recently updated data fields may be selected over less recently updated values. Similar, a source of the data/profile 526 may be given second priority, data completeness of data fields across an entire profile 528 may be given a third priority, data accuracy based on comparing other data fields 530 of a profile given a fourth priority, and other factors given a fifth priority. It should be appreciated that other factors may be considered and/or a different order of priority associated with the different factors. In some cases, other schemes may be utilized for analyzing a number of different criteria for selecting values for data fields that conflict, such as a weighting scheme, neural networks, and other various data analytic techniques, as may be known by those of skill in the art.

Figure 6:
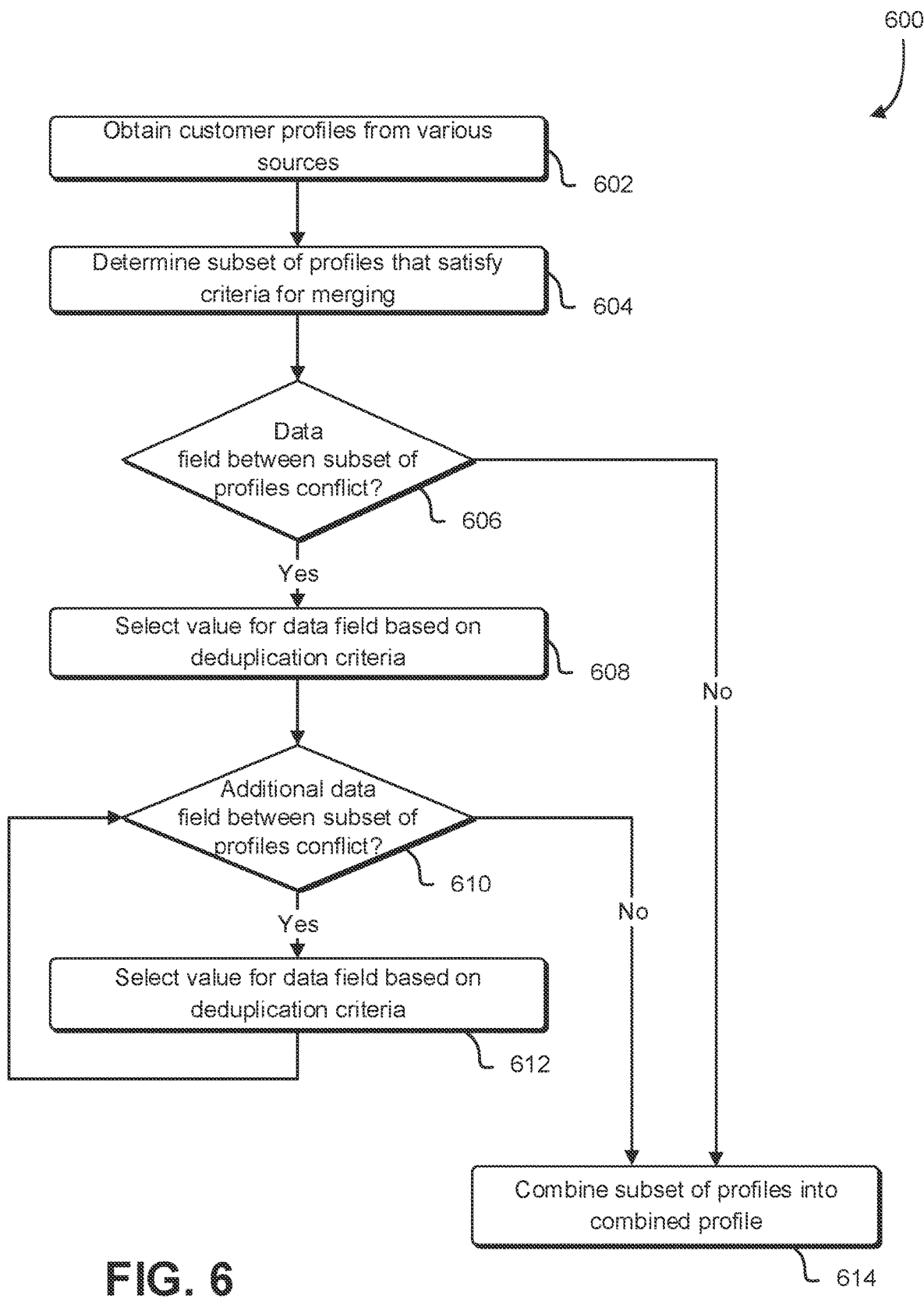
FIG. 6 illustrates an example process for merging profiles, according to at least one embodiment.

FIG. 6 illustrates an example process 600 for merging profiles. In some cases, process 600 may be performed at least in part by a contact service 110, an identity resolution service 116, 202, 302, and/or components thereof, such as a profile selection process 118, 204, 304, a profile deduplication process 120, 208, 310, and/or may utilize one or more of profile merging criteria 206, 308, 502, profile selection model 306, profile deduplication criteria 210, 314, 518, or profile deduplication model 312.

Process 600 may begin at operation 602, in which a number of customer profiles may be obtained from one or more sources, such as from one or more CRM systems. In some cases, optionally, the profiles, once obtained may be normalized such that data contained in the profiles is organized into certain data fields having a specific format, such as to make comparing the profiles more effective. Next, at operation 604, a subset of the profiles may be determined to meet one or more profile merging conditions or criteria. In some cases, operation 604 may include analyzing a number of customer profiles using profile merging criteria or model, such as criteria 206, 308, 502 described above, and/or using one or more machine learning models 306.

At operation 606, it may be determined if any data fields of the subset of profiles conflict. Operation 606 may include comparing one or a number of the data fields of the subset of profiles to determine if any of the values conflict. If no values conflict, then process 600 may proceed to operation 614, in which the subset of profiles may be combined into a combined or merged profile. In some cases, operation 614 may include linking the subset of profiles to the merged profile, such that the subset of profiles that were combined to form the merged profile are accessible from the merged profile, such as via one or more links provided through a user interface. In yet some cases, the system performing process 600 (e.g., the identity resolution service and/or a contact service) may push any updates of any of the subset of profiles in detected from their source or native system (e.g., $3^{rd}$ party CRM systems) to the merged profile, to keep the merged profile up to date. In these scenarios, the identify resolution service may at various times (e.g., upon occurrence of a triggering event, at scheduled times, periodically, etc.), obtain profile information from one or more external systems, such as CRM systems). In the event multiple updates are identified for a single profile, where the updates conflict, a similar deduplication process may be used to determine which value to update the merged profile with.

If at least one of the values conflicts, process 600 may proceed to operation 608, in which a value from at least one of the profiles may be selected for the given data field. In some cases, operation 608 may include implementing a profile deduplication process 120, 208, 310, and/or may utilize one or more of profile deduplication criteria 210, 314, 518, or profile deduplication model 312. Next, at operation 610, it may be determined if any additional data fields conflict. If yes, process 600 may proceed to operation 612 in which a value for the conflicted data field may be selected, similar to operation 608. Process 600 may then loop back to operations 610 and 612, until there are no more conflicted data fields, at which point the subset of profiles may be combined to form a merged profile at operation 614, using the selected values for any conflicting data fields previously identified and resolved in process 600.

Figure 7:
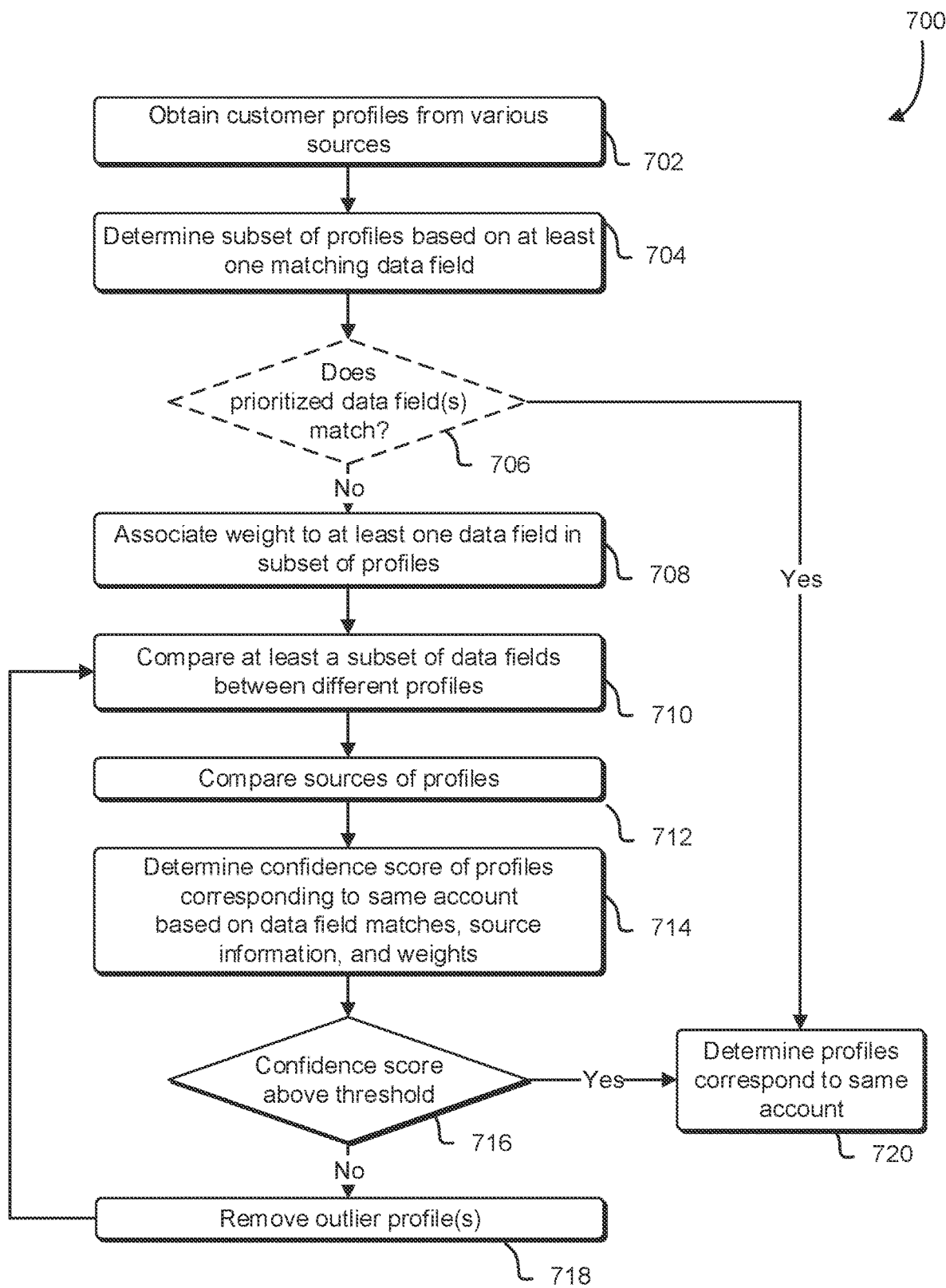
FIG. 7 illustrates an example process for determining a set of profiles suitable for merging, such as by using the profile merging criteria of FIG. 5, according to at least one embodiment.

FIG. 7 illustrates an example process 700 for determining a set of profiles suitable for merging, such as by using the profile merging criteria 502 described above in reference to FIG. 5. In some cases, process 700 may be performed at least in part by a contact service 110, an identity resolution service 116, 202, 302, and/or components thereof, such as a profile selection process 118, 204, 304, and/or may utilize one or more of profile merging criteria 206, 308, 502, or profile selection model 306. In some cases, process 700 may be a more specific example of operations 602 and 604 of process 600 described above.

Process 700 may begin at operation 702, in which customer profiles may be obtained from various sources. Next, at operation 702, a subset of profiles may be selected or identified based on the profiles having at least one matching value in corresponding data filed. As described above, the number of data fields and which specific data fields may be determine based on a number of different factors, and/or may be selected by a user or client. Process 700 may optionally proceed to operation 706, in which it may be determined if values of one or more prioritized data fields (e.g., email address and/or phone number, social security number) match between the subset of profiles. If the determination at operation 706 is positive, process 700 may proceed to operation 720 where it may be determined that the subset of profiles do indeed correspond to the same customer or account, at which point the profiles may be merged. If however, the prioritized data field(s) do not match, or in the case that process 700 does not include operation 706, process may continue to operation 708, in which a weight may be associated to one or more specific data fields of the subset of profiles. In some cases, operation 708 may utilize criteria, such as profile merging criteria 502 described above, for associating a weight to one or more data fields, such as to give more influence on the matching of certain data fields over others (e.g., email address being more indicative of a match than physical address, for example). Additionally, or alternatively, operation 708 may include associating a weight to different criteria, not limited to specific data fields, such as those described in profile merging criteria 502, discussed above.

At operation 710, values of at least a subset of data fields may be compared between the subset of profiles, as described above in reference to FIG. 4. The source of the profiles and/or time information associated with when the profile or individual data fields were last updated may also be compared between the profiles, at operation 712, as also described above in reference to FIG. 4. Next, a confidence score may be determined that indicates to what extent or likelihood the subset of profiles correspond to the same account or customer, at operation 714, based on the outcomes of prior operations. In some cases, operation 714 may generate a confidence score for individual pairs of profiles in the subset of resources, or for the entire subset as combined value. Next, it may be determined if the confidence score is above a threshold value that indicates a high or acceptable likelihood that the profiles do in fact correspond to the same account or customer, at operation 716. The confidence score may be set by a customer, set by default, and/or adjusted based on feedback. If the confidence score is above the threshold, the profiles may be determined to correspond to the same account or customer, at operation 720, and the profiles may be combined. However, if the confidence score is not above a threshold, the profile that differs the most from the subset (e.g., outlier), may be removed from the group, and a confidence score redetermined, via looping back through operations 710, 712, 714, and 71, until it is determined that the confidence score is above the threshold. Looping through process 710-716 may continue until if there are no matching profiles, the most currently updated/ profile associated with the most trustworthy source may be output as a primary profile, and no profiles may actually be merged.

Figure 8:
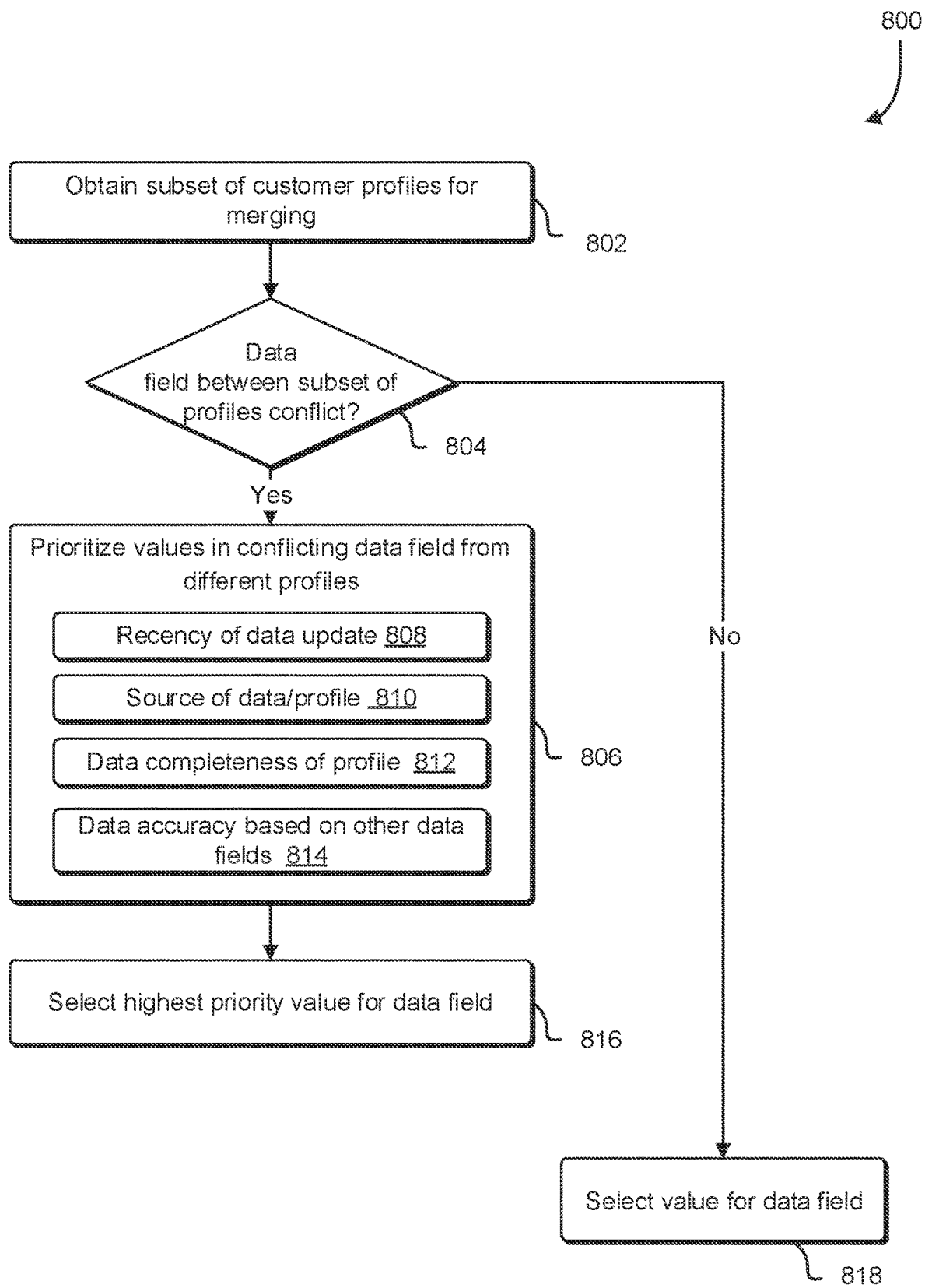
FIG. 8 illustrates an example process for deduplicating data in a number of profiles selected for merging, such as by using the deduplication criteria of FIG. 5, according to at least one embodiment.

FIG. 8 illustrates an example process 800 for deduplicating data in a number of profiles selected for merging, such as by using the profile deduplication criteria 518 described above in reference to FIG. 5. In some cases, process 800 may be performed at least in part by a contact service 110, an identity resolution service 116, 202, 302, and/or components thereof, such as a profile deduplication process 120, 208, 310, and/or may utilize one or more of profile deduplication criteria 210, 314, 518, or profile deduplication model 312. In some aspects, process 800 may be a more detailed example of operations 606 and 608 described above in reference to FIG. 6. In some cases, process 800 may be performed for each data field, such as in parallel.

Process 800 may begin at operation 802, where a subset of profiles already selected for merging may be obtained or received. Next, at operation 804, it may be determined if any conflicts exit between values of corresponding data field between the subset of profiles. If no conflicts exist, the common value may be selected for the data field, at operation 818. However, if a conflict does exist, the value from different profiles in the conflicted data field may be prioritized, at operation 806. In some cases, operation 806 may include prioritizing values from different profiles based on one or more of factors 808-814, which including recent of an update to the data in the data field 808, source of the data or profile 810, data completeness of the profile (number of fields that have data in them) 812, and data accuracy based on accuracy of other fields 814. In some aspects, operation 806 may utilize deduplication criteria, such as criteria 518 described above in reference to FIG. 5. Next, at operation 816, the highest priority value from the different profiles may be selected for use in a merged profile.

Figure 9:
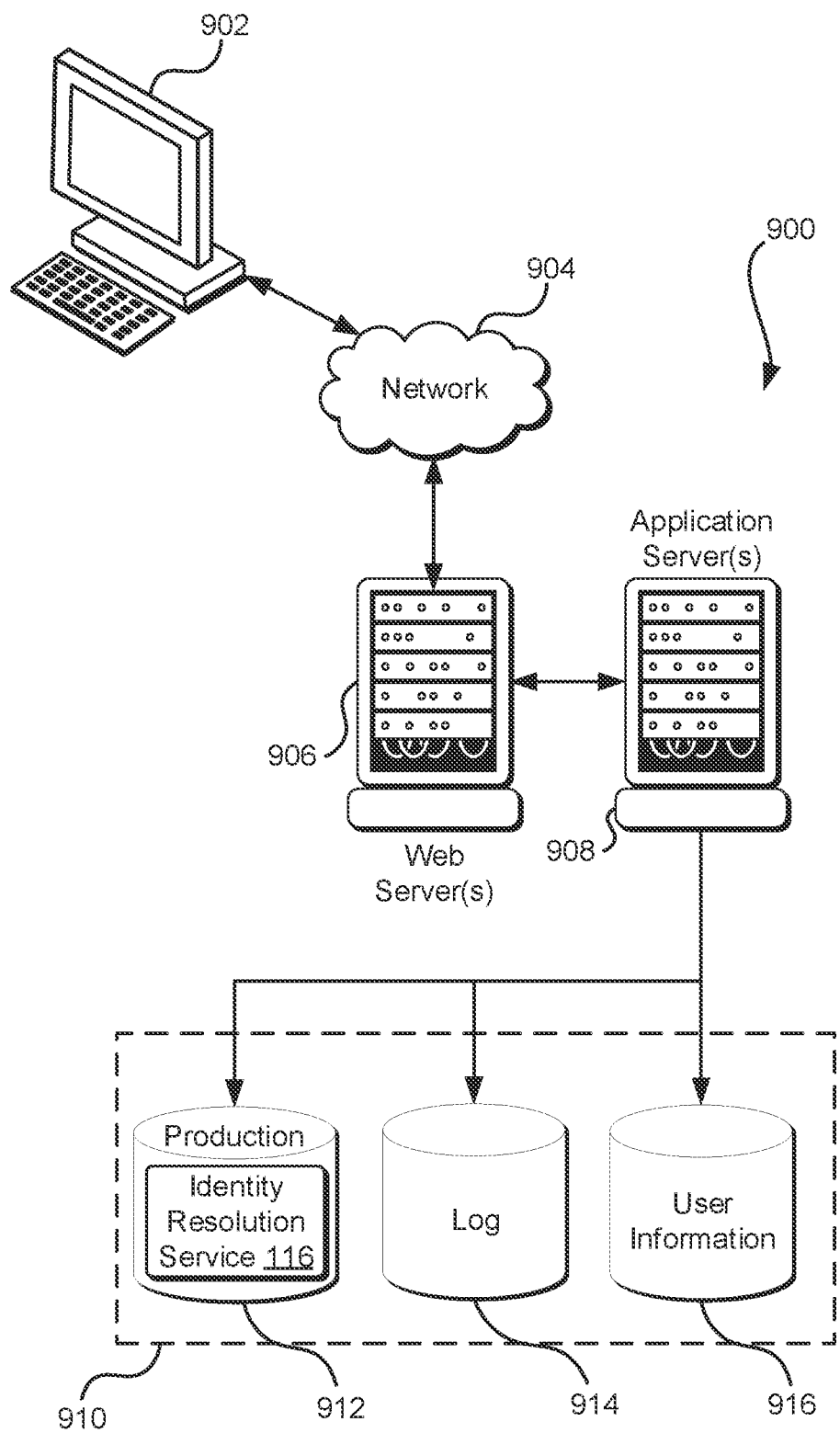
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

In some examples, the application server(s) 908 may host an identity resolution service 116, 202, 302 as described above. The identity resolution service 116, 202, 302 may obtain data from data source which may be store or obtained from data store 910. In other cases, data source may originate or be obtained other services, such as hosted by application server(s) 908.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java °, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors— for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The invention claimed is:

1. A computer-implemented method comprising:
identifying, by a computer-implemented contact center service, at least two profiles of a group of profiles as candidates for merging into a merged profile based on the at least two profiles meeting merging criteria, each of the at least two profiles of the group of profiles indicating an account associated with one of a plurality of disparate third party services and comprising a plurality of data fields;
determining, for the merged profile, a value for each of at least one individual data field from the plurality of data fields of the at least two profiles that conflict with one another by at least prioritizing the value in the at least one individual data field based on:
completeness of data across a number of data fields of the plurality of data fields of each profile of the plurality of profiles, wherein a first profile having data associated with a first number of data fields is prioritized over a second profile having data associated with a second number of data fields, wherein the second number is less than the first number, and at least one of:
a service associated with each of the at least two profiles, or
recency of an update to the individual data field; and
as a result of the at least two profiles meeting the merging criteria, merging the group of profiles into the merged profile using the prioritized value in the at least one individual data field.

2. The computer-implemented method of claim 1, wherein the merging criteria comprises at least one of:
a match between values of a first data field of the plurality of data fields of the at least two profiles; or
a confidence score reaching a value relative to a threshold confidence score, the confidence score indicating correspondence of a subset of data fields of the plurality of data fields between the at least two of profiles.

3. The computer-implemented method of claim 1, further comprising:
associating at least a subset of the group of profiles with the merged profile, wherein at least the subset of profiles are individually accessible from the merged profile.

4. The computer-implemented method of claim 1, further comprising:
using, by the computer-implemented contact service center service, the merged profile instead of any of the at least two profiles.

5. A system, comprising:
at least one processor; and
memory that stores computer-executable instructions that, as a result of being executed by the at least one processor, cause the system to:
determine that at least a subset of profiles of a group of profiles satisfy merging criteria, wherein individual profiles of the group of profiles comprise a plurality of data fields;
identify at least one value in a first data field of the plurality of data fields that conflicts between at least two of the subset of profiles;
select a merged value for the first data field based on data deduplication criteria, wherein the data deduplication criteria comprises at least one indicator of accuracy of values of the plurality of data fields based on completeness of data across a number of data fields of the plurality of data fields of each profile of the group of profiles, wherein the at least one value of a first profile of the subset of profiles is determined to be more accurate than the at least one value of a second profile of the subset of profiles based on the first profile having data for a first number of data fields and the second profile having data for a second number of data fields, wherein the first number is greater than the second number; and
as a result of a determination that at least the subset of profiles of the group of profiles meet the merging criteria, combine at least the subset of profiles into a combined profile using the merged value.

6. The system of claim 5, wherein the merging criteria comprises: at least one exact match between a value of a first data field of the plurality of data fields between the subset of profiles.

7. The system of claim 5, wherein the merging criteria comprises:
a confidence score meeting or exceeding a threshold confidence score, the confidence score indicating correspondence of a subset of data fields of the plurality of data fields between the subset of profiles.

8. The system of claim 7, wherein the computer-executable instructions that cause the system to determine that at least the subset of profiles meet the merging criteria further include instructions that further cause the system to:
as a result of a comparison of the plurality of data fields between the subset of profiles, use a machine learning model to generate a confidence score that indicates correspondence between the subset of profiles.

9. The system of claim 8, wherein the computer-executable instructions further include instructions that further cause the system to:
train the machine learning model based on prior combinations of profiles into combined profiles.

10. The system of claim 5, wherein the computer-executable instructions further include instructions that further cause the system to:
obtain confirmation to combine at least the subset of profiles into the combined profile; and
combine the at least the subset of profiles into the combined profile based on obtaining the confirmation.

11. The system of claim 5, wherein the computer-executable instructions further include instructions that further cause the system to:
associate the subset of profiles with the combined profile, wherein the subset of profiles are individually accessible from the combined profile.

12. The system of claim 5, wherein the data deduplication criteria comprises at least one of:
trustworthiness of accuracy of a source associated with each of the at least two profiles; or
recency of an update to the individual data field for each of the at least two profiles.

13. The system of claim 5, wherein the computer-executable instructions further include instructions that further cause the system to:
normalize formatting or values of at least some of the plurality of data fields for at least the subset of profiles prior to determining that at least the subset of profiles satisfies the merging criteria.

14. A non-transitory computer-readable storage medium storing thereon executable instructions that, as a result of being executed by one or more processors of a computer system, cause the computer system to at least:
determine that at least a subset of profiles of a set of profiles fulfills a merging condition, wherein individual profiles of the set of profiles comprise a plurality of data fields;
identify, from the plurality of data fields, values in a same data field that conflict between at least the subset of profiles;
select a merged value for the same data field based on:
which profile of at least the subset of profiles comprises data for a largest number of data fields, and at least one of:
trustworthiness of accuracy of a source associated with each profile of at least the subset of profiles, or
a time associated with an update to the same data field for at least the subset of profiles; and
based on determining that at least the subset of profiles of the set of profiles fulfills the merging condition, combine at least the subset of profiles into a combined profile using the merged value for the same data field.

15. The non-transitory computer-readable storage medium of claim 14, wherein the instructions that determine that at least the subset of profiles fulfills the merging condition further comprise instructions that, as a result of being executed by the one or more processors, cause the computer system to:
as a result of a comparison of the plurality of data fields between at least the subset of profiles, use a machine learning model to generate a confidence score that indicates correspondence between at least the subset of profiles.

16. The non-transitory computer-readable storage medium of claim 15, wherein the instructions further comprise instructions that, as a result of being executed by the one or more processors, cause the computer system to:
combine the at least the subset of profiles into the combined profile based on obtaining a confirmation from a client device to combine at least the subset of profiles into the combined profile.

17. The non-transitory computer-readable storage medium of claim 16, wherein the instructions further comprise instructions that, as a result of being executed by the one or more processors, cause the computer system to:
train the machine learning model based on prior confirmed combinations of profiles into combined profiles.

18. The non-transitory computer-readable storage medium of claim 15, wherein the instructions further comprise instructions that, as a result of being executed by the one or more processors, cause the computer system to:
provide, to a client device, an indication of a second subset of profiles of the set of profiles that did not fulfill the merging criteria;
receive a response from the client device confirming exclusion of the second subset of profiles from the merged profile; and
train the machine learning model based on the response.

19. The non-transitory computer-readable storage medium of claim 15, wherein the instructions further comprise instructions that, as a result of being executed by the one or more processors, cause the computer system to:
provide an indication of a second subset of profiles of the set of profiles that did not fulfill the merging criteria;
receive a response requesting to include at least one of the second subset of profiles in the merged profile;
modify the merged profile to include the at least one of the second subset of profiles; and
train the machine learning model based on the response.

20. The non-transitory computer-readable storage medium of claim 14, wherein the merging condition comprises:
at least one match between a value of a first data field of the plurality of data fields between the subset of profiles, the first data field comprising one of email address or phone number.

21. The non-transitory computer-readable storage medium of claim 14, wherein the instructions further comprise instructions that, as a result of being executed by the one or more processors, cause the computer system to:
determine that a profile of the set of profiles does not fulfill the merging condition as a result of at least one of:
the first profile being associated with an untrustworthy data source or service, or
a value of at least one data field of the first profile being different than a value of the at least one data field of the subset of profiles; and
exclude the first profile from the subset of profiles for merging based on the determining.

22. The non-transitory computer-readable storage medium of claim 14, wherein the instructions further comprise instructions that, as a result of being executed by the one or more processors, cause the computer system to:
associate the subset of profiles with the combined profile, wherein the subset of profiles are accessible from the combined profile.

* * * * *